(Model.)

E. BRADLEY & A. F. ROWHOUSE.
Tire Tightener.

No. 242,504. Patented June 7, 1881.

Witnesses
Fred G. Dieterich
Albert H. Krause

Inventors.
Egbert Bradley
Andrew F. Rowhouse
by Louis Bagger & Co.
Attorneys

N. PETERS. Photo-Lithographer, Washington, D. C.

UNITED STATES PATENT OFFICE.

EGBERT BRADLEY AND ANDREW F. ROWHOUSE, OF MIDLAND, MICHIGAN.

TIRE-TIGHTENER.

SPECIFICATION forming part of Letters Patent No. 242,504, dated June 7, 1881.

Application filed May 11, 1880. (Model.)

*To all whom it may concern:*

Be it known that we, EGBERT BRADLEY and ANDREW F. ROWHOUSE, both of Midland city, in the county of Midland and State of Michigan, have invented certain new and useful Improvements in Tire-Tighteners; and we do hereby declare that the following is a full, clear, and exact description of the invention, which will enable others skilled in the art to which it appertains to make and use the same, reference being had to the accompanying drawings, which form a part of this specification, and in which—

Figure 1:
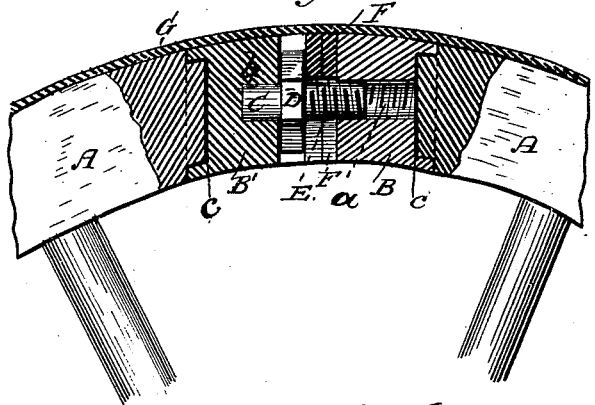
Figure 2:
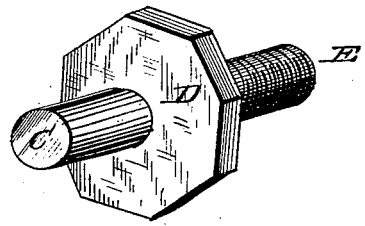
Figure 3:
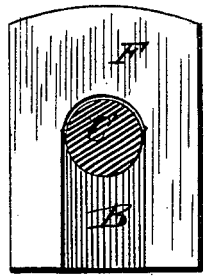

Figure 1 is a longitudinal section of a felly joint or box provided with our improved tire-tightener. Fig. 2 is a perspective view of the tightening-bolt detached; and Fig. 3 is a cross-section, showing the slotted washers in position upon the bolt.

Similar letters of reference indicate corresponding parts in all the figures.

This invention relates to the joints or boxes for coupling or uniting the fellies of a vehicle-wheel; and it consists in the combination, with a pair or set of such boxes, of a tightening-screw and slotted washers, which ride upon said screw between the faces of adjacent boxes, substantially as and for the purpose hereinafter more fully set forth.

In the drawings, A A are two of the fellies of an ordinary wheel for vehicles, which said wheel may be of any preferred construction. The end of each of the fellies A A is socketed into a box, B B', which said boxes are, by preference, made of malleable iron, and of the same thickness, width, and general configuration as that presented by the fellies in cross-section. One of the boxes, B', has a cylindrical bore, $b$, and the opposite box, B, has a corresponding screw-threaded bore, $a$, which extends back to the socket $c$, that receives the tenoned end of the felly.

The tightening-bolt, which works between the two boxes or cap-pieces B B', consists of three parts or sections—viz., a cylindrical tap, C, which fits into the cylindrical bore $b$ of the cap-piece B', a nut, D, and a screw, E, on the opposite side of the nut, which works into the screw-threaded perforation $a$ in the cap-piece B.

F F are slotted washers, of which there may be one or more, which are inserted upon screw E, between the face of the box or cap-piece B and nut D. Each of these washers conforms in shape and dimensions to the faces of the boxes B B', the slot $f$ being just wide enough to admit of the insertion of the screw E.

From the foregoing description, taken in connection with the drawings, the operation of this invention will be readily understood. By turning screw-bolt C E by means of its nut D and a suitably-constructed wrench or key, the tire G may be tightened or slackened at will by expanding or contracting the space between the fellies A A, thus preventing dishing of the wheel by slacking the fellies in wet or damp weather, and preventing loosening of the tire in warm weather by expanding the rim of the wheel to take up the slack.

By inserting the wedges F F between the cap-piece B and nut D, in the manner described, the strain is taken off the screw-threaded part E of the bolt, the said wedges being clamped firmly between the cap-piece B and nut D, as shown in Fig. 1 of the drawings.

One of the surfaces of the rectangular plate F $f$ is rounded in such a manner that by placing one arm between the bolt C and the tire it may readily be forced or turned into place.

We are aware that it is not new with us to use a screw-rod to force the fellies apart and thus tighten the tire, as such construction is shown in several patented devices.

We place importance upon the mortises; but the essential feature of the invention lies in the slotted plates F. Without these plates a considerable portion of the felly-rim would be without support, and in case of much shrinkage and considerable tightening this unsupported portion of the tire would become bent out of proper form and become an injury to the wheel. This we avoid by having conveniently at hand a number of these slotted plates F, and when the tire has been tightened, or, in other words, the gaps between the felly-joints have been opened sufficiently, we place one or more of these plates F in position, when, by slacking or unscrewing the bolts slightly, we relieve the screw from the strain.

We are aware that it is not new to employ a screw and nut to force the fellies apart and thus tighten the tire. We are also aware that wedges and plates have been used in the joints between the fellies; but in all such constructions known to us the holding devices are secured to the inner faces of the fellies, and are insecure in case of sudden jar or force produced by that part of the tire striking a stone, railroad-track, or the like suddenly. In our device the bearing is solid and against the bolt.

Having thus described our invention, we claim and desire to secure by Letters Patent of the United States—

The slotted plates F, constructed, arranged, and adapted to serve, in combination with the boxes B B', having mortises $c$, the nut D, arm C, threaded rod E, and tenoned fellies A, as and for the purposes set forth.

In testimony that we claim the foregoing as our own we have hereto affixed our signatures in presence of two witnesses.

EGBERT BRADLEY.
  ANDREW F. ROWHOUSE.

Witnesses:
 B. F. BRADLEY,
 A. W. MUNSAL.